(12) United States Patent
Chang

(10) Patent No.: US 11,085,786 B2
(45) Date of Patent: Aug. 10, 2021

(54) NAVIGATION USING AUGMENTED REALITY

(71) Applicant: Apple Inc., Cupertino, CA (US)

(72) Inventor: Jae Woo Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 16/251,771

(22) Filed: Jan. 18, 2019

(65) Prior Publication Data

US 2019/0226866 A1 Jul. 25, 2019

Related U.S. Application Data

(60) Provisional application No. 62/619,597, filed on Jan. 19, 2018.

(51) Int. Cl.

| | |
|---|---|
| *G01C 21/36* | (2006.01) |
| *G06T 11/00* | (2006.01) |
| *G06T 19/00* | (2011.01) |
| *G06K 9/00* | (2006.01) |

(52) U.S. Cl.
CPC ..... *G01C 21/3647* (2013.01); *G01C 21/3632* (2013.01); *G01C 21/3638* (2013.01); *G01C 21/3658* (2013.01); *G06K 9/00* (2013.01); *G06T 11/00* (2013.01); *G06T 19/006* (2013.01)

(58) Field of Classification Search
CPC ............ G01C 21/3647; G01C 21/3632; G01C 21/3638; G01C 21/3658; G06K 9/00; G06T 11/00; G06T 19/006

USPC ......................................................... 701/533
See application file for complete search history.

(56) References Cited

U.S. PATENT DOCUMENTS

| | | | |
|---|---|---|---|
| 5,471,205 A | * 11/1995 | Izawa ................ | G01C 21/367 340/988 |
| 2011/0093194 A1 | * 4/2011 | Paik ..................... | G01C 21/32 701/532 |
| 2014/0244159 A1 | 8/2014 | Musabji et al. | |
| 2017/0008521 A1 | 1/2017 | Braunstein et al. | |
| 2019/0283754 A1 | * 9/2019 | Toda ..................... | B60W 30/17 |

* cited by examiner

*Primary Examiner* — Gertrude Arthur Jeanglaude

(74) *Attorney, Agent, or Firm* — Kilpatrick Townsend & Stockton LLP

(57) ABSTRACT

Embodiments disclose a computer-implemented method for guiding a user along a route, the method including receiving route information from a route server, where the route information includes geographical positions of roads and designated lanes of travel for each of a plurality of segments along the route, and receiving a series of images captured by the camera along the route. The method includes analyzing the series of images to determine a horizon and one or more available lanes of travel along the route, identifying one or more designated lanes from the one or more available lanes based on the analyzing of the series of images, and displaying the series of images along with a navigational layer superimposed over the series of images to the user, the navigational layer comprising a blocked region covering areas of the series of images outside of the one or more designated lanes and below the horizon.

20 Claims, 10 Drawing Sheets

NAVIGATION USING AUGMENTED REALITY

CROSS-REFERENCES TO RELATED APPLICATIONS

This application claims the benefit of U.S. provisional application No. 62/619,597, filed Jan. 19, 2018, which is herein incorporated by reference in its entirety for all purposes.

BACKGROUND

Modern mobile devices (e.g., smartphones) can run applications that help navigate the user from one location to another. These navigational applications can utilize GPS coordinates to determine the location of a mobile device and plot an intended travel route that can be used to guide the user from the location to a destination location. As the user traverses the intended travel route, such applications provide a top down view of a grid of streets and directional data to instruct the user where to turn along the intended travel route. The directional data can include symbols, such as arrows, for guiding the user along route. The time and effort required by the user to interpret these symbols can inhibit the ease at which the intended route is traversed and can lead to misdirection.

BRIEF SUMMARY

Embodiments can provide for improved devices, interfaces, and methods for navigation along a route between two locations, e.g., by providing lane guidance along the route. For instance, some embodiments can augment a user's perceived reality by capturing images in front of the user (e.g., in front of a vehicle) and superimposing a navigational layer over a display of those captured images in real time. By superimposing the navigational layer over the captured images, the user can clearly and easily understand which lane to be positioned in without having to decipher how general symbols correlate with the real world.

In some embodiments, a computer-implemented method for guiding a user along a route between at least two locations includes, at a mobile device that has a display and a camera positioned to take images in front of a vehicle, receiving route information from a route server, where the route information includes geographical positions of roads and designated lanes of travel for each of a plurality of segments along the route, and receiving a series of images captured by the camera along the route. The method includes analyzing the series of images to determine a horizon and one or more available lanes of travel along the route, identifying one or more designated lanes from the one or more available lanes based on the analyzing of the series of images, and displaying the series of images along with a navigational layer superimposed over the series of images to the user, the navigational layer comprising a blocked region covering areas of the series of images outside of the one or more designated lanes and below the horizon.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1A:
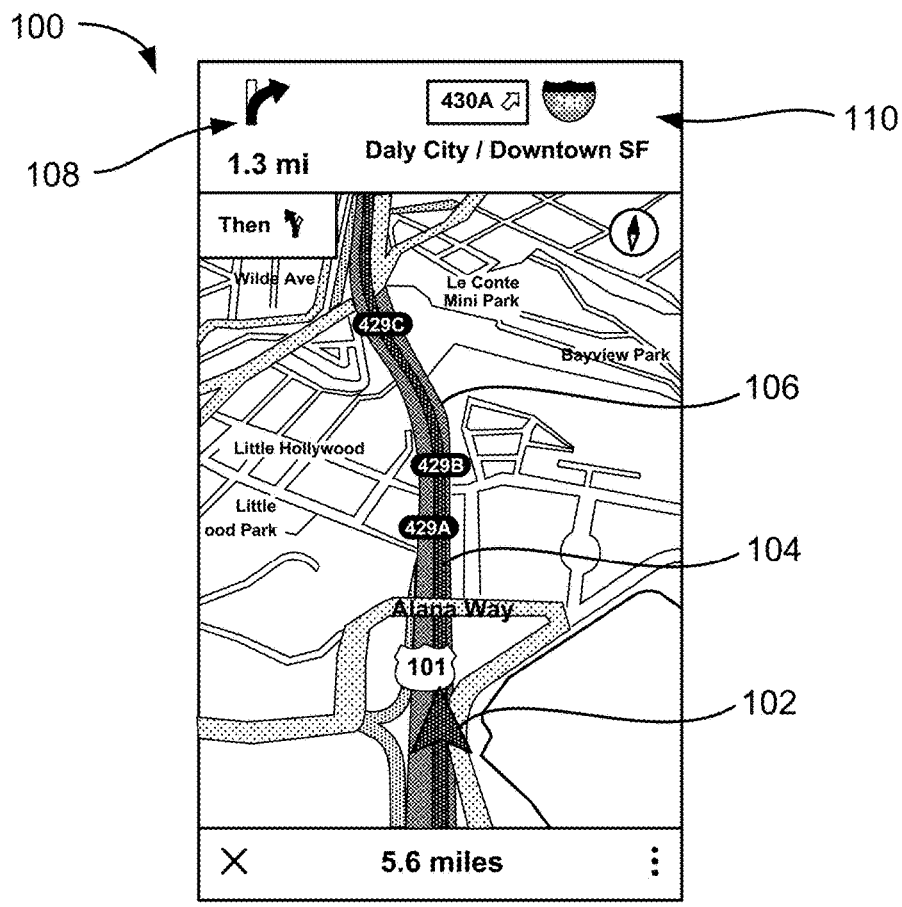
FIGS. 1A and 1B are snapshots illustrating exemplary interfaces provided by conventional devices for navigation.

An augmented reality device, according to some embodiments of the present disclosure, can enhance and improve the ease at which a device can convey lane guidance information to a user that is traveling along a route. The device can capture a series of images (e.g., video footage) in front of the augmented reality device that closely represents what is actually perceived by the user, and display the captured series of images in real time, e.g., on a screen of the device or as a projection. Concurrently, the device can superimpose a navigational layer over the displayed captured images to guide the user into one or more lanes that would best position the user to proceed along the route.

To enable this functionality, the augmented reality device can be configured to communicate with one or more global positioning system (GPS) satellites and one or more route servers. The GPS satellites can utilize triangulation to provide the location of the device, and the route server can utilize one or more databases to provide route information regarding the route of travel between an origin location and a destination location (or to each intervening location between the origin and destination locations). The route information can include, but is not limited to, road information (e.g., identification of roads along the route, what segments of those road will be traveled, the geographical position of those roads, the geographical position of lanes within each road, and in what order will the roads be traveled), turn information (e.g., what turns are needed along the route and in what order), lane information (e.g., number and position of lanes for each road segment), and distance information (e.g., distance to travel on each segment of road). In some embodiments, the augmented reality device can also be configured to communicate with any other positioning systems, such as, but not limited to, wireless fidelity (WiFi)-based positioning systems, cellular based positioning systems, satellite-based positioning systems, and any other global navigation satellite systems (GNSS).

With this information, the augmented reality device can analyze the video footage to determine the number of available lanes. The device can then correlate the video footage with the location of the device, which can be taken as the location of the vehicle, and identify one or more designated lanes from the one or more available lanes in which the vehicle should be traveling to stay in the route. The device can display the series of images along with a navigational layer over the series of images to guide the user into the correct lane, or a plurality of correct lanes, if applicable.

In some embodiments, the navigational layer can block out regions (e.g., lanes, curbs, sidewalks) of the captured images where the vehicle is not intended to travel, and leave unblocked regions (e.g., lanes) where the vehicle is intended to travel. That way, the user can clearly understand which lane he or she should be in. In additional embodiments, the navigational layer can include an indicator positioned over the unblocked region. The indicator can be a single guidance arrow or a series of guidance arrows that point toward the direction in which the user should travel. For instance, the indicator can be a straight arrow that points diagonally to the right, indicating that the user should switch lanes to the right. In another instance, the indictor can be a series of multiple diagonal arrows that blink in a sequential order indicating the same. The indicator can blink to convey a degree of urgency at which the user should perform the indicated task. Additionally, in some embodiments, a pop up window can appear in the navigational layer to provide more information to the user about the upcoming turn. For example, the pop up window can be a birds eye view of a turn that the user is about to take. That way, the user can better understand what is about to happen.

Superimposing a navigational layer over video footage of what the user can see helps clearly communicate navigational and lane guidance information to the user. The augmented reality device can provide significant improvements in navigation and lane guidance over conventional devices that merely provide symbols to guide a user along a route. Devices that provide navigation using symbols require the user to decipher the symbols in real time and immediately apply them to what the user is perceiving, which may not always be easy to do.

I. Navigation Using Symbols

Traveling from an origin location to a destination location is a trivial concept; but in the real world, traveling between these two locations can be extremely complex because it can involve traversing many different roads that extend in varying directions, each potentially with a different number of lanes. This can get exponentially more difficult if there are intervening destinations (e.g., pit stops) between the two locations. Naturally, the large network of roads lends itself to provide more than one way to get from the origin location to the destination location. Some routes may be more direct, while others may take less time to travel. In an effort to determine the shortest route (or quickest route), modern mobile devices can be equipped with applications that direct a user, in a step-by-step fashion, along a route from the origin location to the destination location.

Often times, these instructions are communicated to the user with general symbols and icons or with an arrow along a highlighted route, requiring the user to interpret these symbols and apply them to what the user is perceiving in the real world. The time and effort required to interpret these symbols can inhibit the ease at which the intended route is traversed and can lead to misdirection.

Figure 1B:
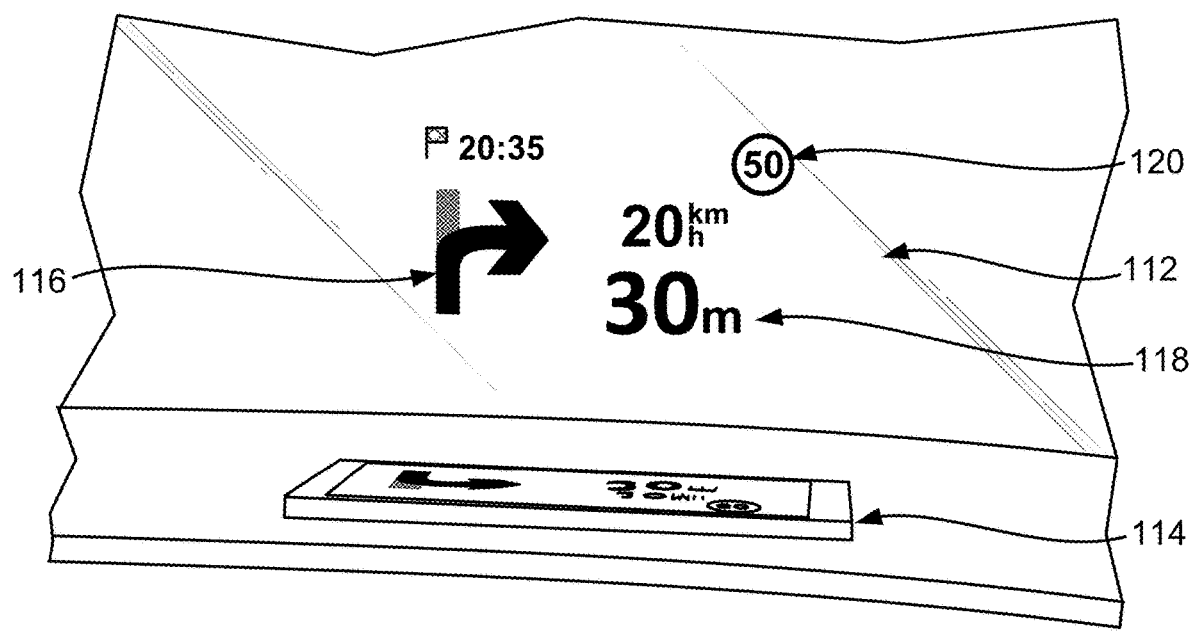

FIGS. 1A and 1B illustrate exemplary interfaces provided by conventional devices for navigation. As shown in FIG. 1A, interface 100 includes a birds eye view of a portion of an application-generated map surrounding a user, which is represented by an arrow head 102. Arrow head 102 is shown traversing along a route 104 illustrated as a blue line on a road 106 illustrated as a yellow stripe. Upcoming turns are shown as a symbol 108 on the top left side of interface 100, and current road/street information is shown on the top right side of the interface 100. With this interface, the user has to look away from the road to look at the device, interpret the map surrounding the user, interpret symbol 108, make sure the blue line has not moved, and determine whether the user is on the correct road, all of which require diversion of attention from the road and expense of mental capacity that distracts from the user's ability to drive the vehicle.

To minimize the amount of distraction these navigation devices can cause, some conventional navigation devices project instructions and symbols onto a head-up display. A head up-display is a transparent display created by reflecting an image off of a transparent panel that presents data without requiring a user to look away from his or her usual viewpoint. FIG. 1B illustrates an exemplary head-up display interface 112 provided by a conventional navigation device 114. Contents displayed by device 114 can reflect off a vehicle windshield to present head-up display interface 112. The contents of interface 112 include upcoming route information in the form of symbol 116 and additional route information, such as distance 118 to the next turn and/or the speed limit 120. With such interfaces, the user does not have to look away from the road, but the user still has to interpret symbol 116 and translate that into what the user is perceiving in the real world. In some instances, translating the symbol to apply to the real world can be mentally taxing and can take time to decipher, which can hinder the usability of the navigational device.

II. Navigation and Lane Guidance Using Augmented Reality

Rather than using mere symbols or application-generated maps with route lines and arrows for navigation, embodiments of the present disclosure utilize augmented reality to perform navigation and lane guidance. Augmented reality describes a technology in which a live view of the real world is supplemented with computer-generated data, such as text, graphics, or audio. In other words, the real world as seen by an augmented reality device is enhanced with additional features. With the use of augmented reality, the real world may become interactive and informative. For example, information about a route may be overlaid onto a real-world scene (perceived by the user as the user is traveling along a segment of the route) to provide the user with more information about the path of travel along the segment.

Figure 2:
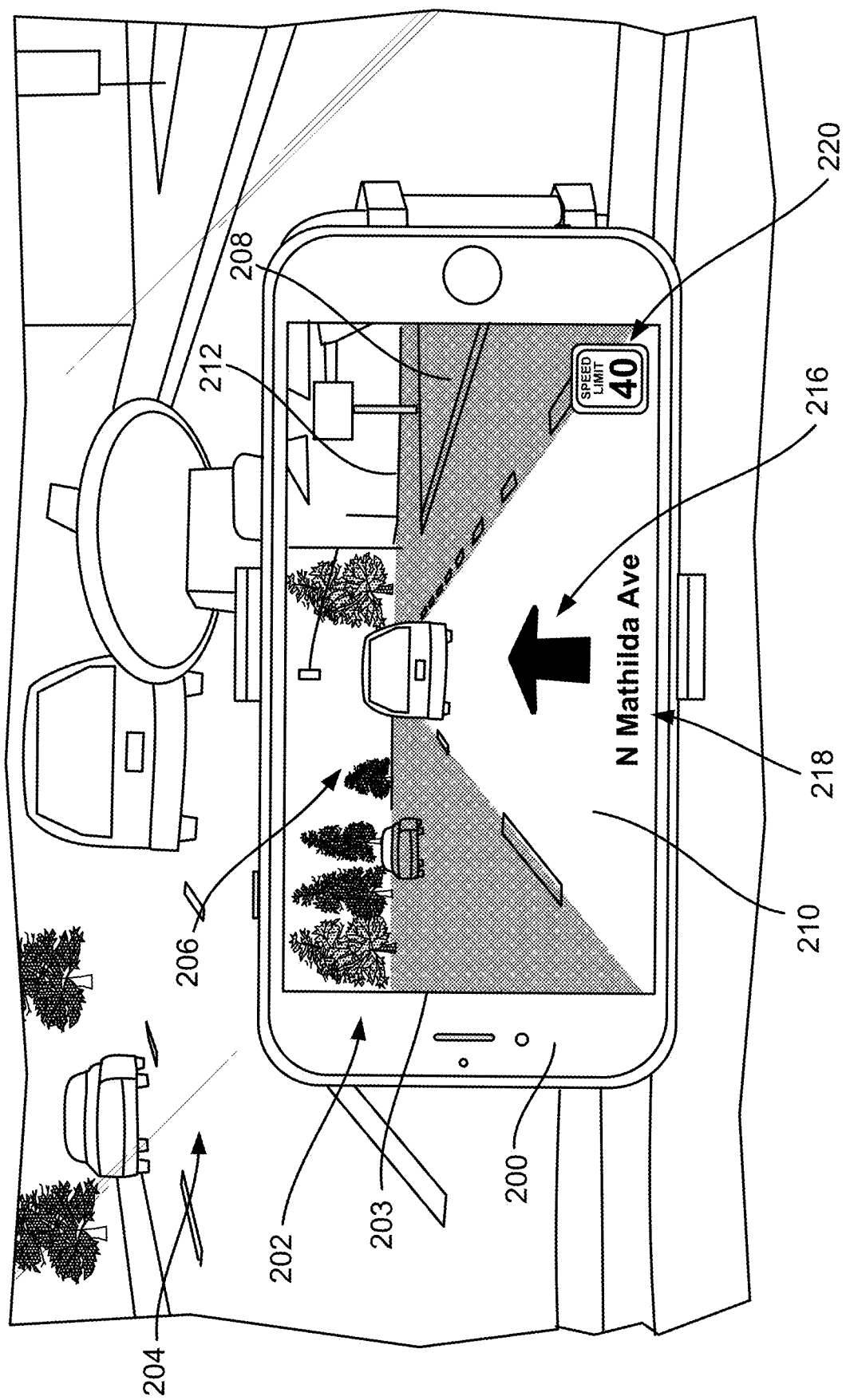
FIG. 2 is a snapshot illustrating an exemplary navigational interface of an augmented reality device, according to some embodiments of the present disclosure.

FIG. 2 illustrates an exemplary navigational interface 202 provided by an augmented reality device 200, according to some embodiments of the present disclosure. Augmented reality device 200 can be any suitable device configured to capture or receive a series of images (e.g., a video), perform calculations on the captured images, and display the series or images to a user on a display screen 203 while concurrently superimposing a navigational layer over the series of images. In some embodiments, augmented reality device 200 is a smart device, such as a smart phone, or a wearable device, such as a pair of smart glasses.

In some embodiments, augmented reality device 200 can generate and superimpose a navigational layer over the series of image as it is being displayed to the user in real time. For example, device 200 can capture images of a scene 204 from a viewpoint similar to that of a user's viewpoint as he or she is driving a vehicle. The captured images of scene 204 can be displayed by the augmented reality device 200 as video footage 206. As video footage 206 is displayed to the user, augmented reality device 200 can superimpose a navigational layer over video footage 206. In some embodiments, the navigational layer can be computer-generated data that provides more information about the captured images than what is merely perceived from the viewpoint of the user.

The navigational layer can include a blocked region 208 and an unblocked region 210. Blocked region 208 can be a semi-opaque layer that covers a portion of video footage 206. The semi-opaque layer can have a manmade, artificial appearance so that a user does not mistake the semi-opaque layer to be an actual, real-world obstacle. In some embodiments, blocked region 208 can be any other pattern suitable for covering a portion of video footage 206. For instance, blocked region 208 can be a hashed pattern, checkerboard pattern, chevron pattern, and the like to indicate that the portion of video footage 206 is blocked. Blocked region 208 can also be, in some embodiments, a monochromatic pattern that displays the portion of video footage 206 in a black-and-white color scheme to indicate that the portion of video footage 206 is blocked. Content covered by blocked region 208 can still be visible so that the user can still see and be aware of what is covered by blocked region 208, as shown in FIG. 2. Blocked region 208 can represent areas that would lead the user outside of the route, such as one or more lanes that end up causing the user to deviate from the route, or be difficult to make turns at certain decision points.

Unblocked region 210 can be a portion of the navigational layer that does not block video footage 206, thereby allowing video footage 206 in the unblocked region 210 to be clearly displayed. In some embodiments, unblocked region 210 can represent areas that lead the user along the intended route. By unblocking where the user needs to be, interface 202 can clearly indicate where the user needs to be to proceed along the route without requiring the user to decipher how a symbol translates to what is perceived from his or her viewpoint.

In certain embodiments, blocked region 208 and unblocked region 210 can be positioned below a horizon 212, as shown in FIG. 2. Horizon 212 can correlate with the actual horizon seen from the user's viewpoint and thus represent a horizontal division between the sky and the ground. By providing horizon 212, the navigational layer can clearly indicate that the blocked region 208 applies to the ground upon which the user is traveling and not the sky.

The combination of displaying blocked and unblocked regions enables the navigational layer to clearly communicate in a straight forward manner where the user should be to proceed along the route to get to the destination location, and where the user should not be to avoid deviating from the route. That way, the user will not have to decipher symbols and correlate the symbol with what the user perceives. Accordingly, device 200 is an improved device over conventional devices that only provide symbols for the user to decipher.

In addition to blocked region 208 and unblocked region 210, the navigational layer can also include additional features such as one or more indicators and texts. For instance, the navigational layer can include an indicator 216 that visually communicates to the user the intended direction of travel. The navigational layer can also include text 218, such as the name of the street, road, or highway along which the user is currently traveling. Furthermore, the navigational layer can include additional road information, e.g., speed limit information 220, to inform the user what the maximum speed of travel is for the current road. The navigational layer can also include more route information, such as upcoming turn information in the form of a pop-up window. All of these features will be discussed in detail further herein.

III. Implementation of an Augmented Reality Device

Figure 3:
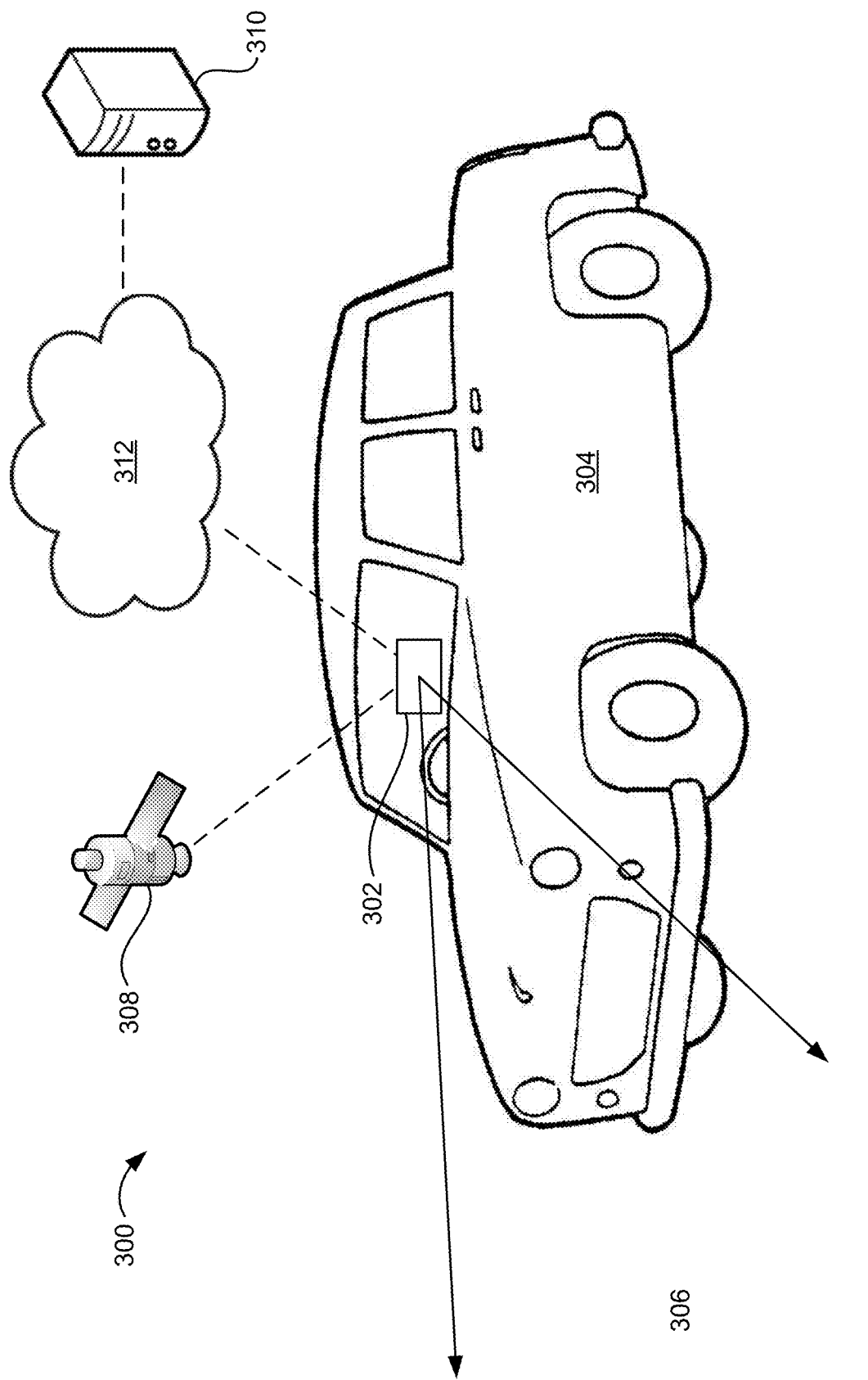
FIG. 3 is a snapshot illustrating an exemplary implementation of an augmented reality device, according to some embodiments of the present disclosure.

FIG. 3 illustrates an exemplary implementation 300 of an augmented reality device 302, according to some embodiments of the present disclosure. Augmented reality device 302 can be used in a vehicle 304 that is capable of being driven or otherwise controlled by a user. In some embodiments, augmented reality device 302 can include a camera (not shown) for capturing images of front area 306, or can include hardware and software for communicating with a separate camera positioned to capture images of front area 306. If device 302 includes a camera, then device 302 can be positioned against a windshield or anywhere within vehicle 304 so that device 302 can perceive a front area 306 of vehicle 304. In some embodiments, device 302 can be integrated into vehicle 304.

To enable augmented reality device 302 to provide navigational and/or lane guidance functions, augmented reality device 302 can be configured to communicate with external devices, such as one or more GPS satellites 308 and a route server 310 through a wireless network 312. GPS satellite 308 can provide GPS coordinates of device 302 that represent a geographical location of device 302. Route server 310 can be an application server that receives an origin location and a destination location from device 302 (including any intervening locations between the origin and destination location) and provides route information (e.g. in map form) for traveling between the two locations (as well as between any intervening locations along the route). Route information can be communicated to device 302 via wireless network 312, which can be any suitable network with which device 302 can interact to receive and send information with route server 310, such as any suitable cellular network (e.g., LTE, CDMA, GSM, and the like).

Augmented reality device 302 can be configured to receive location data from GPS satellite 308 and route information from route server 310, analyze captured images to determine available lanes in front of vehicle 304, apply the route information and location data to the analyzed images, and then superimpose a navigational layer over the captured images while the captured images are concurrently displayed to the user, thereby providing an augmented reality interface to a user, e.g., interface 202 in FIG. 2. According to some embodiments of the present disclosure, augmented reality device 302 can include an augmented reality system that enables device 302 to perform these functions.

Figure 4:
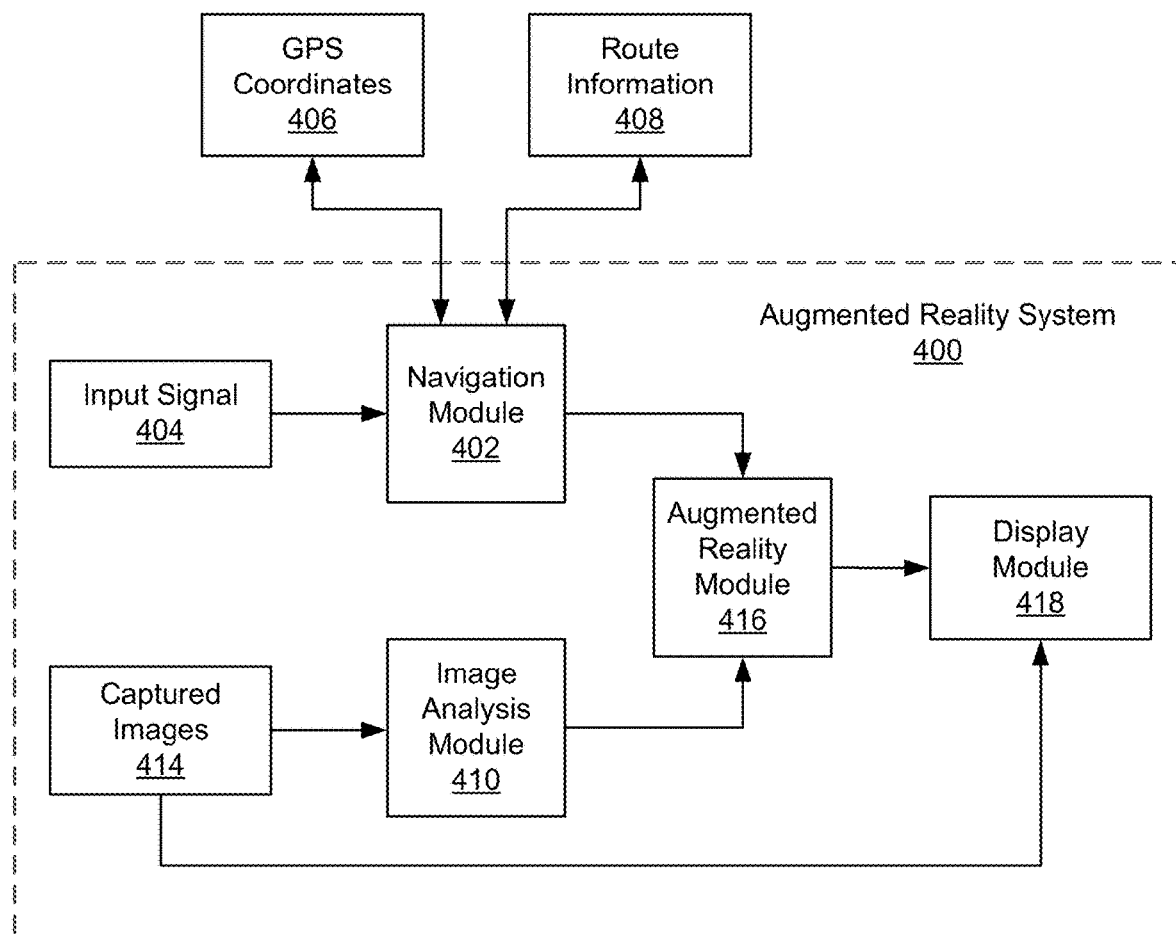
FIG. 4 is a block diagram illustrating an exemplary augmented reality system that can be implemented in an augmented reality device to enable the features of navigation and lane guidance using augmented reality, according to some embodiments of the present disclosure.

FIG. 4 is a block diagram illustrating an exemplary augmented reality system 400 that can be implemented in an augmented reality device to enable the features of navigation and lane guidance using augmented reality, according to some embodiments of the present disclosure. Some blocks shown in FIG. 4 can be software modules stored in memory of an augmented reality device, e.g., device 302 in FIG. 3, and accessible by a processor (not shown) to execute the software module to perform a specific function. Other blocks can represent data and/or signals that are received by or sent from the software modules.

Augmented reality system 400 includes a navigation module 402 configured to receive an input signal 404. Input signal 404 can be generated by an input device, which can be a touch sensitive display, keyboard, and the like. In some embodiments, input signal 404 can be a user input indicating that the user desires to find a route between two locations. If known by the user, input signal 404 can also include addresses of the origin location, designation location, or both. If the current location of the device is unknown, then navigation module 402 can query and receive GPS coordinates 406 from a GPS satellite. The received GPS coordinates 406 can then be used as the origin location for determining the route to the destination location.

Navigation module 402 can also query and receive route information 408 from a route server through a communication network, as discussed herein with respect to FIG. 3. Route information 408 can include information pertaining to the route between the origin location and the destination location. For example, route information can include, but is not limited to, road information (e.g., identification of roads along the route, what segments of those road will be traveled, the geographical position of those roads, the geographical position of lanes within each road, and in what order will the roads be traveled), turn information (e.g., what turns are needed along the route and in what order), lane information (e.g., number and position of lanes for each road segment), and distance information (e.g., distance to travel on each segment of road). Depending on the user's route preference in terms of fastest route, shortest route, and the like, navigation module 402 can determine a desired route between the origin location and destination location. Navigation module 402 can also identify route information for the desired route between the origin location and designation location. Once the route information is identified, navigation module 402 can compare the vehicle's GPS coordinates 406 with the geographical position of the road and the geographical position of the lanes within the road to determine which lane the vehicle is currently traveling in.

Augmented reality system 400 can also include an image analysis module 410. Image analysis module 410 can receive a series of captured images 414 that may be captured by a camera. In some instances, captured images 414 is real-time video footage of an area in front of a vehicle, e.g., front area 306 discussed herein with respect to FIG. 3, while the vehicle is being driven by a user. Image analysis module 410 can analyze, in real time, captured images 414 to identify and distinguish the position of one or more objects present in captured images 414. For instance, image analysis module 410 can analyze captured images 414 to identify one or more available lanes in the road on which the vehicle is currently traveling. In some instances, the available lanes can be identified by the position of lane markers or dotted lane dividers on the ground. Additionally, image analysis module 410 can determine the location of each dotted lane in the captured image. In some embodiments, image analysis module 410 can also determine the location of each available lane and the position of the vehicle in relation to those available lanes. The available lanes can be the number of lanes in a road on which a vehicle can travel. Image analysis module 410 can also identify the curvature of the lane, the presence of road barriers, and any other physical object that the user may want to be aware of while traveling on the road.

According to some embodiments of the present disclosure, augmented reality system 400 can include an augmented reality module 416. Augmented reality module 416 can receive the route information for the desired route as well as the identity and position of objects analyzed from the captured images, and then analyze the route information and the identified objects to determine how the route information correlates with the identified objects. For example, augmented reality module 416 can receive GPS coordinates of the current position of the vehicle and route information from navigation module 402, as well as the identification and position of the available lanes as determined by image analysis module 410. Augmented reality module 416 can then correlate the current position of the vehicle with where the vehicle is along the route, and then determine which available lane from the captured images should be the designated lane, i.e., the lane in which the vehicle should be traveling to proceed along the route. If the vehicle is on a road with multiple lanes and is far away from the next turn, then any of the available lanes can be a designated lane because the user just needs to be traveling forward. If, however, the vehicle is on a road with multiple available lanes but is approaching a turn, then the designated lane can be the far right lane (or far left lane) so that it can be properly positioned to take the turn. Once the designated lane is determined, augmented reality module 416 can create a suitable navigational layer that would indicate to a user to travel in the designated lane. For instance, augmented reality module 416 can create a navigational layer that unblocks a far right lane and blocks all other lanes.

Once this correlation is made between the route information and the identified objects, augmented reality module 416 can create a suitable navigational layer that would indicate to a user to travel in the designated lane and output this navigational layer to display module 418. Display module 418 can then drive a user interface (e.g., a display screen) to convey the correlation in an easy-to-understand format to the user. For instance, augmented reality module 416 can create a navigational layer that unblocks a far right lane and blocks all other lanes, and send this navigational layer to display module 418. Display module 418 can then output a live stream of the video footage along with the navigational layer superimposed over the video. In some embodiments, augmented reality module 416 relays the captured images to display module 418, as well as determines the navigational layer and sends the navigational layer to display module 418. Correlating the route information with the identified objects in real time allows augmented reality module 416 to provide information to display module 418 to clearly convey in an easily understood manner where the user should be while traveling along the route. To this end, the user interface can display a navigational layer that is designed to provide clear guidance on where the user should be along the route.

An example is provided for ease of understanding. In this example, navigation module 402 conveys to augmented reality module 416 the identity of the road on which the vehicle is currently traveling and that a right turn is coming up in 500 feet. Navigation module 402 can also convey which lane should be the designated lane based on the upcoming turn, such as the far right lane. Image analysis module 410 conveys to augmented reality module 416 that there are four available lanes on which the vehicle can travel, the location of each lane divider that divides the road into the four lanes, and conveys the identity and location of the available lane that is currently being traveled on by the vehicle. Knowing that the far right lane is the designated lane per the route information from navigation module 402, augmented reality module 416 can determine which of the available lanes identified by image analysis module 410 is the far right lane and subsequently create and convey a navigational layer to display module 418 that blocks out the three left lanes and unblocks the right-most lane. The border of blocked and unblocked regions can be defined by the location of the lane dividers identified by image analysis module 410, which is conveyed to augmented reality module 416. Augmented reality module 416 can also relay the captured images from image analysis module 410 to display module 418 so that display module 418 can display raw footage of the captured images. Or, in some instances, display module 418 can directly receive captured images without being relayed by augmented reality module 416, as shown in FIG. 4. Display module 418 can then display the captured images and superimpose the navigational layer over the displayed captured images.

IV. User Interface for Augmented Reality

A user interface is the means by which a user and a computer system interact. According to some embodiments of the present disclosure, a user interface for an augmented reality device can be a display that provides for a visual representation of data, and in some cases, can be a touch sensitive display that can also receive inputs. This user interface can output a series of captured images (e.g., a live stream of video footage) of an area in front of a vehicle while simultaneously superimposing a navigational layer over the series of captured images to clearly convey to the user where he or she should be while traveling along a route.

A. Blocking Regions of Unintended Travel and Unblocking Regions of Intended Travel According to some embodiments, a navigational layer can include blocked regions and unblocked regions disposed below a horizon for clearly displaying where the user should be along the route. The navigational layer can change in real time and provide information pertinent to that specific location along the route. For instance, the unblocked region can convey to the user that he or she should proceed forward, switch lanes, or turn right or left, as the user is traveling along the route.

Figure 5A:
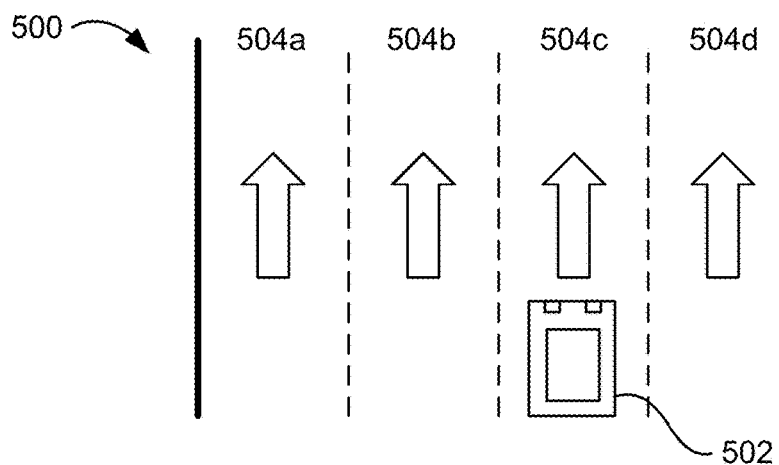
FIG. 5A is a simplified top-down diagram of a vehicle traveling along a segment of an exemplary route, according to some embodiments of the present disclosure.

FIG. 5A is a simplified top-down diagram of a vehicle 502 traveling along a segment 500 of an exemplary route. An augmented reality device can be utilized by a user in vehicle 502, e.g., by being mounted on a windshield or mounted to the dashboard to capture images in front of vehicle 502, as discussed herein with respect to FIG. 3. As shown in FIG. 5A, segment 500 has four available lanes 504a-d, all of which are substantially straight and can be identified by an image analysis module, e.g., image analysis module 410 discussed herein with respect to FIG. 4. Available lanes 504a-d can be lanes in which vehicle 502 can travel.

Figure 5B:
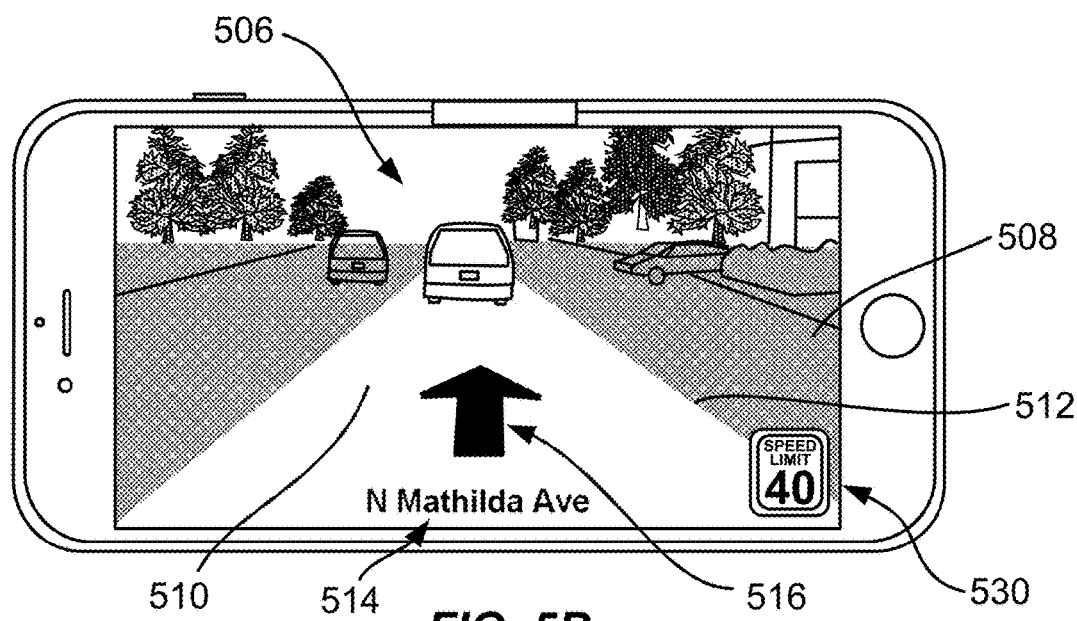
FIGS. 5B and 5C are snapshots illustrating a navigational layer superimposed over captured images for an exemplary case where only one lane in a multi-lane segment of road is a designated lane, according to some embodiments of the present disclosure.

In some instances, only one of lanes 504a-d may be the designated lane, e.g., a preferred lane or the lane that allows the vehicle to progress along the route to the destination location. FIG. 5B illustrates a navigational layer superimposed over captured image 506 where only one lane, e.g., 504c, in a multi-lane segment of road is a designated lane, according to some embodiments of the present disclosure. This may occur when a turn is forthcoming but still far enough away that vehicle 502 can travel faster in the lane adjacent to the turn lane but can still easily switch into the turn lane when the turn approaches. In this case, the navigational layer can include a blocked region 508 and an unblocked region 510 where unblocked region 510 only exposes lane 504c. As further shown in FIG. 5B, blocked region 508 and unblocked region 510 can be divided by a border 512. In instances where only one lane is the designated lane, border 512 can extend along the lane dividers for the designated lane, as shown in FIG. 5B. However, if more than one lane are designated lanes, then the border between unblocked and blocked regions can cross multiple lanes, as discussed herein with respect to FIG. 5C.

Figure 5C:
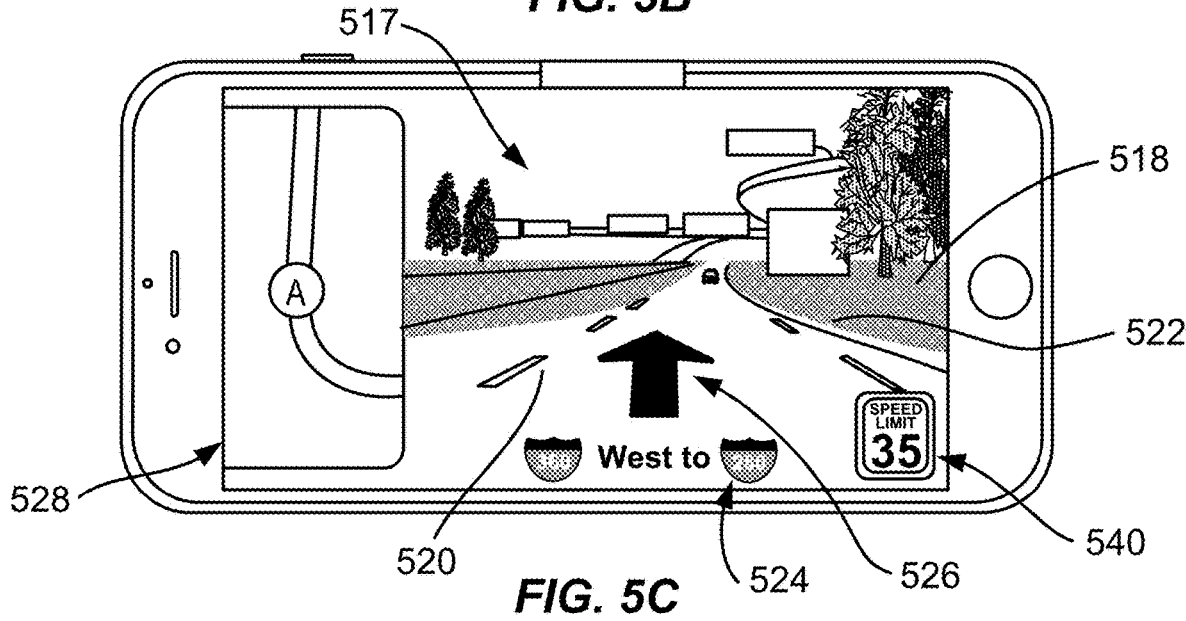

FIG. 5C illustrates a navigational layer superimposed over captured image 517 where more than one lane, e.g., 504b-d, in a multi-lane segment of road is a designated lane, according to some embodiments of the present disclosure. This may occur when vehicle 502 is traveling along a highway and there are no immediate upcoming turns. In this case, the navigational layer can include a blocked region 518 and an unblocked region 520 where unblocked region 520 exposes at least a portion of lanes 504b-d. Blocked region 518 and unblocked region 520 can be divided by a border 522, which can extend across the lane dividers of the designated lanes 504b-d, as shown in FIG. 5C. It is to be appreciated that captured image 506 and 517 are each a single still image from respective series of captured images that, when each series is viewed together, forms a video, such as video footage of an area in front of vehicle 502.

According to some embodiments, the navigational layer can also include additional features such as one or more indicators and texts for guiding the user forward. For instance, the navigational layer of FIG. 5B can include an indicator 516, text 514, and additional road information such as speed limit information 530. Similarly, the navigational layer of FIG. 5C can include an indicator 526, text 524, and speed limit information 540; and in some instances, it can also include a pop-up window 528. All of these features will be discussed in detail further herein in subsections B and C of section IV.

Figure 6A:
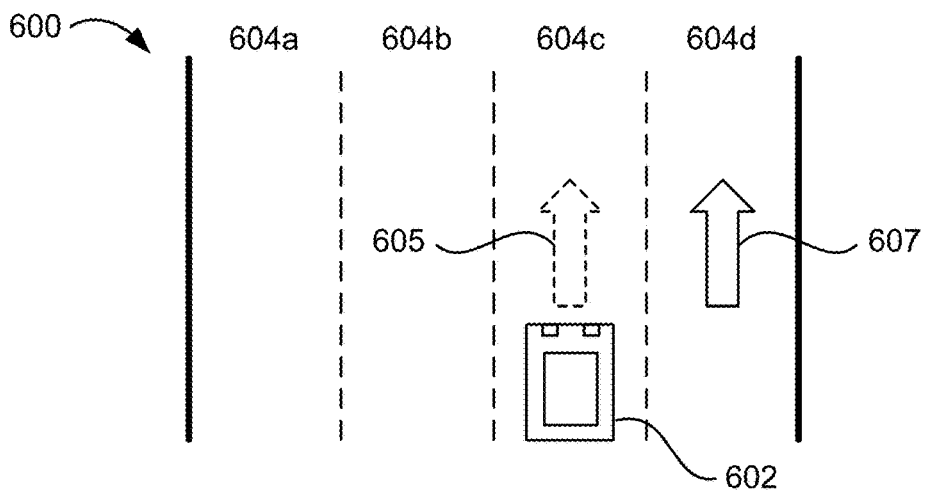
FIG. 6A is a simplified top-down diagram of a vehicle traveling along a segment that is a continuation of the exemplary route discussed in FIG. 5A, but is now approaching an upcoming right turn, according to some embodiments of the present disclosure.

A typical route, however, includes many turns and is not straight the entire time. Thus, as vehicle 502 travels along the route, vehicle 502 may need to change lanes to move into a better position to make the upcoming turn. FIG. 6A is a simplified top-down diagram of vehicle 602 traveling along segment 600 that is a continuation of the exemplary route discussed in FIG. 5A, but is now approaching an upcoming right turn. Thus, vehicle 602 can correspond with vehicle 502, and lanes 602a-d can correspond with lanes 502a-d in FIG. 5A. As shown in FIG. 6A, the designated lane has switched from 604c to 604d, i.e., the right-most lane. Because the designated lane is now lane 604d and yet vehicle 602 is still in lane 604c, vehicle 602 needs to merge to lane 604d. This change in designated lane is shown by dotted arrow 605, which represents the old designated lane, and by solid arrow 607, which represents the new designated lane.

Figure 6B:
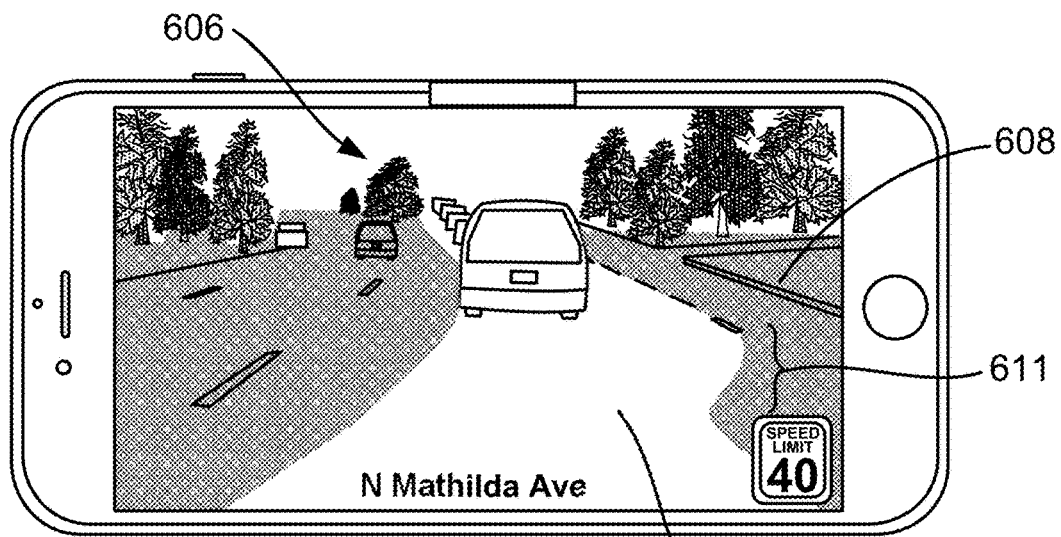
FIGS. 6B and 6C are snapshots illustrating a navigational layer superimposed over captured images for an exemplary case where the designated lane has shifted to an adjacent lane, according to some embodiments of the present disclosure.

According to some embodiments of the present disclosure, the navigational layer can guide the user to navigate vehicle 602 into lane 604d by changing the blocked and unblocked regions. FIG. 6B illustrates a navigational layer superimposed over captured image 606 for an exemplary case where the designated lane has shifted to an adjacent lane, according to some embodiments of the present disclosure. For instance, the designated lane can shift from lane 604c to adjacent lane 604d. In this case, the navigational layer can include a blocked region 608 and an unblocked region 610 where unblocked region 610 includes a transition region 611 that extends from lane 604c and gradually moves across into lane 604d, as shown in FIG. 6B. Transition region 611 can have a shape that is similar to how a vehicle typically merges into an adjacent lane. If vehicle 602 travels with the shape of unblocked region 610, then vehicle 602 will end up in lane 604d and have an unblocked region similar to unblocked region 510 discussed in FIG. 5B. However, if vehicle 602 does not travel with the shape of unblocked region 610, then vehicle 602 may begin to travel on blocked region 608, as shown in FIG. 6C.

Figure 6C:
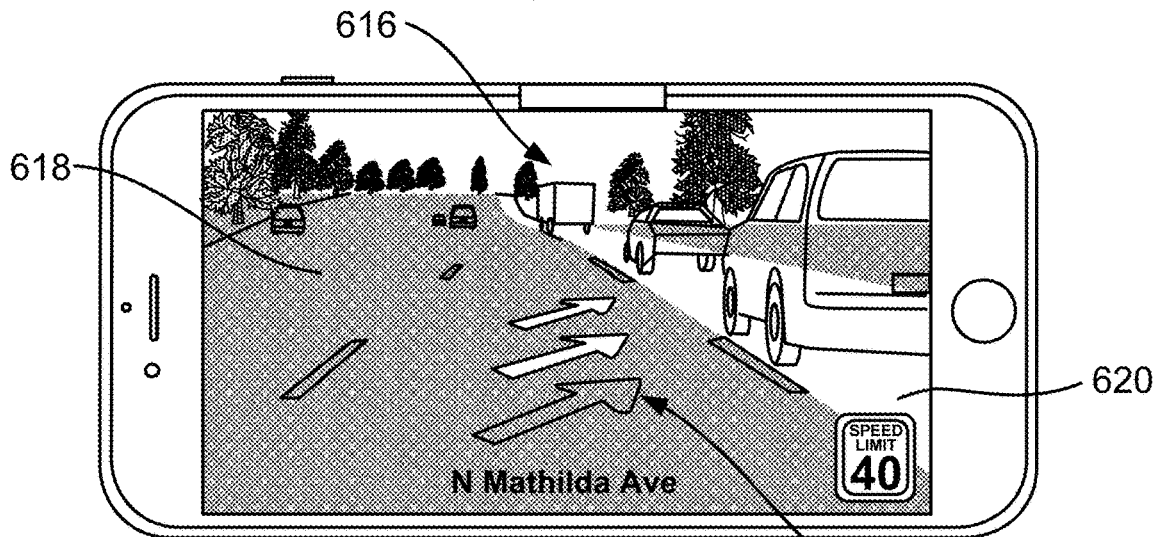

FIG. 6C illustrates a navigational layer superimposed over captured image 616 for an exemplary case where vehicle 602 is traveling in an available lane and not in a designated lane, according to some embodiments of the present disclosure. This may occur when vehicle 602 did not follow transition region 611 to merge into the designated lane, e.g., lane 604d, and is still in lane 604c. In this case, the navigational layer can include a blocked region 618 and an unblocked region 620 where blocked region 618 is shown to appear as though vehicle 602 is traveling on blocked region 618 and unblocked region 620 exposes the adjacent lane. Having the appearance of traveling on blocked region 618 while having the adjacent lane be part of unblocked region 620 can give the user a sense that something is awry and thus create a desire to move into unblocked region 620.

According to some embodiments of the present disclosure, the navigational layer can also include one or more animated indicators 626 to communicate a greater sense of urgency, especially when an upcoming turn is encountered. Animated indicators 626 can be a single arrow that blinks at a certain frequency, or multiple arrows that blink in an animated fashion, such as in a sequential order, as will be discussed further herein in subsection B of section IV.

Figure 7A:
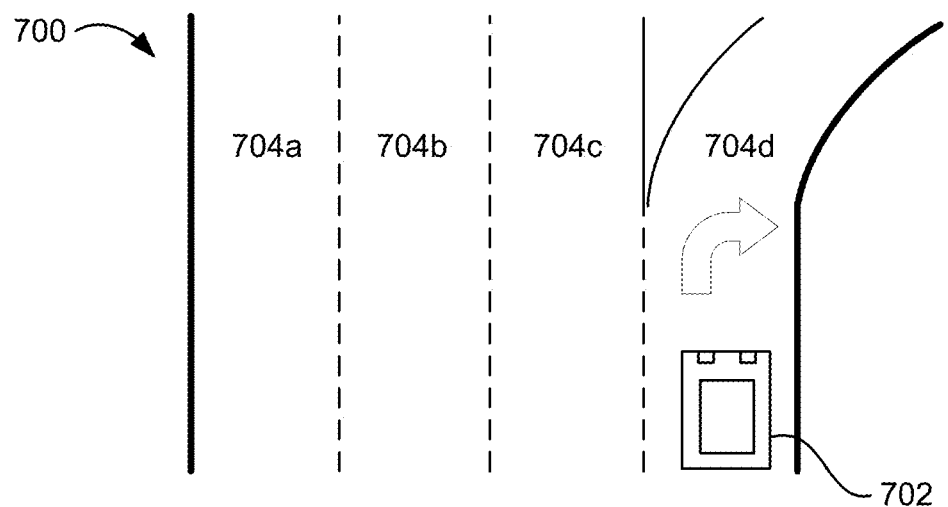
FIG. 7A is a simplified top-down diagram of vehicle traveling along a segment that is a continuation of the exemplary route discussed in FIG. 6A, but is now encountering the upcoming right turn, according to some embodiments of the present disclosure.

After switching into the turn lane, vehicle 602 will then encounter a turn in the route. According to some embodiments of the present disclosure, the navigational layer can guide the user through the turn. FIG. 7A is a simplified top-down diagram of vehicle 702 traveling along segment 700 that is a continuation of the exemplary route discussed in FIG. 6A, but is now encountering the upcoming right turn. Thus, vehicle 702 can correspond with vehicle 502 and vehicle 602, and lanes 702a-d can correspond with lanes 502a-d in FIGS. 5A and 602a-d in FIG. 6A. Accordingly, as shown in FIG. 7A, the designated lane, e.g., lane 704d, now has a curve to the right that vehicle 702 will traverse.

Figure 7B:
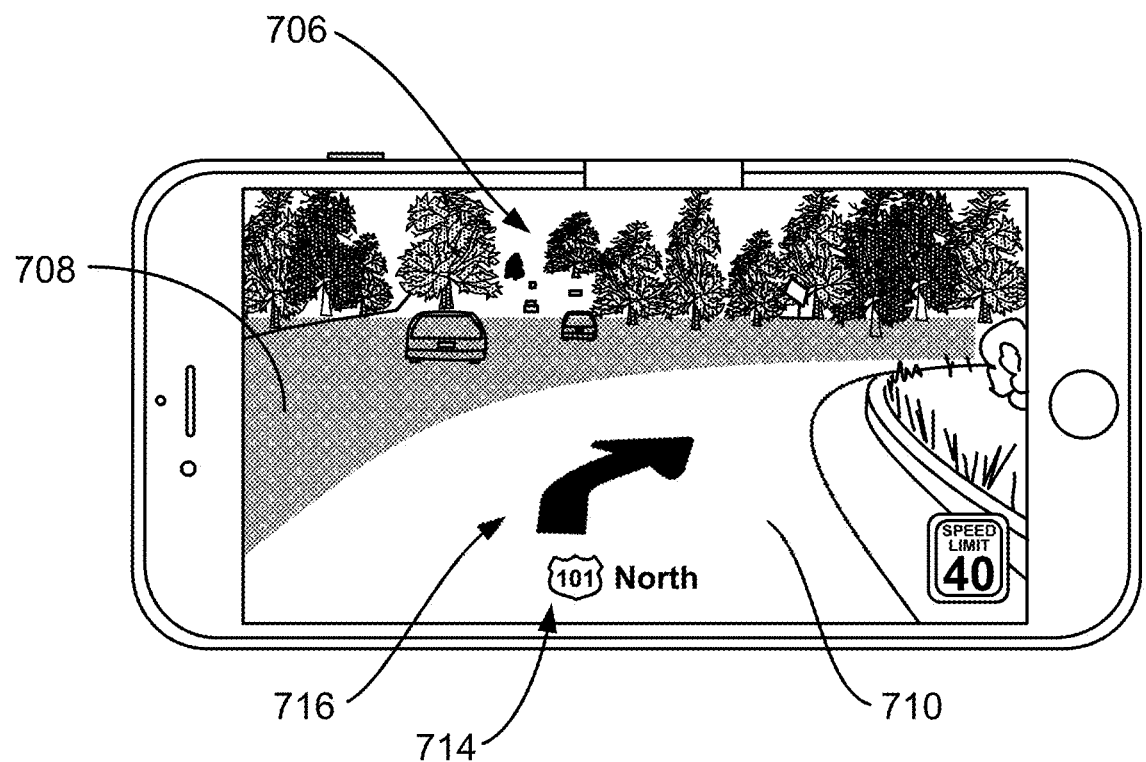
FIG. 7B is a snapshot illustrating a navigational layer superimposed over a captured image for the exemplary case of FIG. 7A where the segment of the designated lane is a turn, according to some embodiments of the present disclosure.

According to some embodiments of the present disclosure, the navigational layer can guide the user to navigate vehicle 702 through the turn in lane 704d by changing the blocked and unblocked regions. FIG. 7B illustrates a navigational layer superimposed over captured image 706 for an exemplary case where segment 700 of the designated lane is a turn, according to some embodiments of the present disclosure. The turn can be an exit of a highway, an intersection between two roads, or any other transfer between roads that requires a left or right turn. In this case, the navigational layer can include a blocked region 708 and an unblocked region 710 where unblocked region 710 follows the shape of the turn, as shown in FIG. 6B. In some embodiments, blocked region 708 can follow an edge of unblocked region 710 so that blocked region continuously extends across an entire display screen of the augmented reality device from its left to right edge. By extending across the entire display screen, blocked region 708 can appear as a barrier to communicate to the user that the route turns and that he or she should not travel forward. If vehicle 702 travels with the shape of unblocked region 710, then vehicle 702 will successfully traverse the turn and proceed along the route.

According to some embodiments of the present disclosure, the navigational layer can also include additional features such as one or more indicators and texts for guiding the user through a turn. For instance, the navigational layer of FIG. 7B can include an indicator 716 that conveys a turn, text 714 that states the identity of the road that vehicle 702 is turning on, and additional road information such as speed limit information 730. All of these features will be discussed in detail further herein in subsections B of section IV.

As can be appreciated by the disclosures and illustrations of FIGS. 5A-7B, providing an unblocked region that shows which lane is the designated lane as the user perceives it from his or her viewpoint clearly conveys navigational and lane guidance information to the user in an easily understood manner. Accordingly, the augmented reality device according to some embodiments of the present disclosure improves the way in which a device can provide navigation and lane guidance instructions to a user.

B. Turn Indicators and Text

As mentioned herein, the navigational layer can include features such as one or more indicators and texts to aid in navigation and lane guidance along a route, as mentioned herein. An indicator can communicate to the user information in a visual manner. For instance, an indicator can communicate the current and/or upcoming direction of travel. The indicator can be in the form of a symbol, such as a vertical arrow, slanted arrow, curved arrow, and the like, depending on whether the route requires the vehicle to stay in the current lane, switch lanes, or make a turn.

As an example, indicator 516 in FIG. 5B communicates to the user that he or she should continue traveling forward. This may be suitable when the vehicle is currently traveling on the designated lane and there are no immediate upcoming turns. In another example, indicator 716 in FIG. 7B communicates to the user that he or she is or will soon be turning in a certain direction. Indicator 716 can have a curved shape that follows the direction of the upcoming turn. In some embodiments, indicator 716 appears when the vehicle is a threshold distance away from the actual turn. For instance, indicator 716 can appear when the vehicle is positioned between 100 and 500 feet away from the turn. That way, the user can be aware of the turn before it is encountered.

In yet another example, indicator 626 in FIG. 6C can communicate to the user that he or she should switch lanes into a designated lane. This may occur when the user is approaching a turn but has not followed the unblocked region and is currently in the blocked region, as discussed herein with respect to FIG. 6C. In some embodiments, indicator 626 is a slanted arrow that points toward the designated lane. Indicator 626 can be a solid arrow or an animated indicator that blinks with a certain frequency. The frequency at which indicator 626 blinks can be inversely proportional to the distance between the vehicle and the turn. For example, the blinking frequency can increase as the vehicle gets closer to the turn. Furthermore, as shown in FIG. 6C, indicator 626 can include more than one arrow. The arrows can blink in an animated fashion, such as in a sequential order, or the group of arrows can all blink together.

In some embodiments, the indicator can be positioned near the center of the display and below the horizon, particularly in the lower half of display screen, so that it is easily viewable by the user and is not blocking the upcoming route. As an example, the indicator can be positioned on a portion of the unblocked region as shown in FIGS. 2, 5B, 5C, 6C, and 7B.

The navigational layer can also include text, such as the name of the street, road, or highway along which the user is currently traveling. As an example, text 514 in FIG. 5B states the name of the road on which the vehicle is currently traveling. In another example, text 714 in FIG. 7B states the name of the road that the vehicle will be traveling on after the turn is made. In other examples, the text can indicate a distance to the upcoming turn, as shown herein with respect to FIGS. 8B and 8C. By providing text to the user, the user can be more aware of his or her current position along the route and of his or her next position along the route.

In some embodiments, such text can be positioned on the display screen in a location that is easily perceived by the user. For instance, text can be positioned below the indicator as shown in FIGS. 2, 5B, 5C, 6C, and 7B. Although disclosures herein show the text as being positioned below the indicator, embodiments are not so limited. Additional or alternative embodiments can have the text positioned in any other position around the indicator, such as beside or above the indicator.

The navigational layer, in some embodiments, can include additional road information that a user might need while traveling along the route. For example, the navigational layer can include speed limit information, such as speed limit information 220 shown in FIG. 2. This information can be positioned proximate to an edge of the display screen to avoid distracting the user's attention away from the blocked and unblocked regions.

C. Display Area with Additional Information

According to some embodiments of the present disclosure, the navigational layer can include a display area that provides additional information to the user as he or she travels along the route. The display area can show additional information when an upcoming turn is unusual or complex and when more information about the route from a different perspective would be useful to the user. For instance, the display area can show a top-down bird's eye view of the upcoming turn that displays a complete profile of the turn. In some embodiments, the display area is a pop-window that is displayed on a portion of the display screen and that only appears temporarily. As an example, the pop-up window can appear when the vehicle is a certain distance away from the unusual turn, and disappear when the vehicle has completely traversed the turn. An exemplary navigational layer including a display area for showing additional information is discussed herein with respect to FIGS. 8A-8C.

Figure 8A:
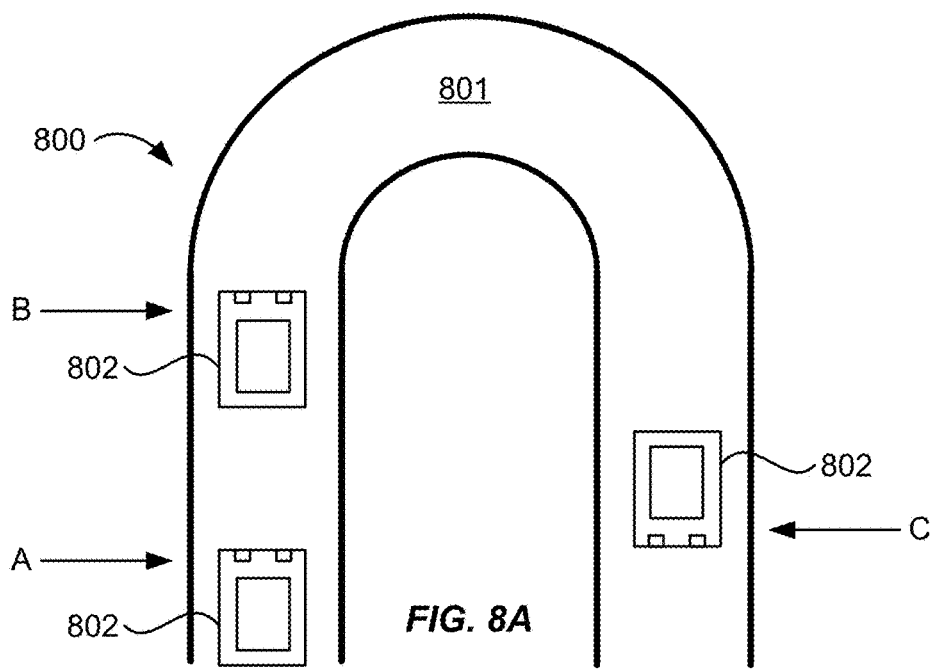
FIG. 8A is a simplified top-down diagram of a vehicle traveling along a segment of an exemplary route having an unusual turn, according to some embodiments of the present disclosure.

FIG. 8A is a simplified top-down diagram of vehicle 802 traveling along segment 800 of an exemplary route, according to some embodiments of the present disclosure. Segment 800 of designated lane 801 is a u-turn, and vehicle 802 is shown at three points along the u-turn: point A, point B, and point C. Point A may be the point where vehicle 802 is approaching the u-turn and is a threshold distance away from the u-turn. The threshold distance may be the distance at which a pop-up window appears. For instance, the threshold distance may be between 400 to 500 feet. Point B may be the point where vehicle 802 encounters the u-turn. And, point C may be the point where vehicle 802 has completely traversed the u-turn. In some embodiments, the pop-up window may disappear at point C because the user has successfully traversed the u-turn and no longer needs information about the turn.

Figure 8B:
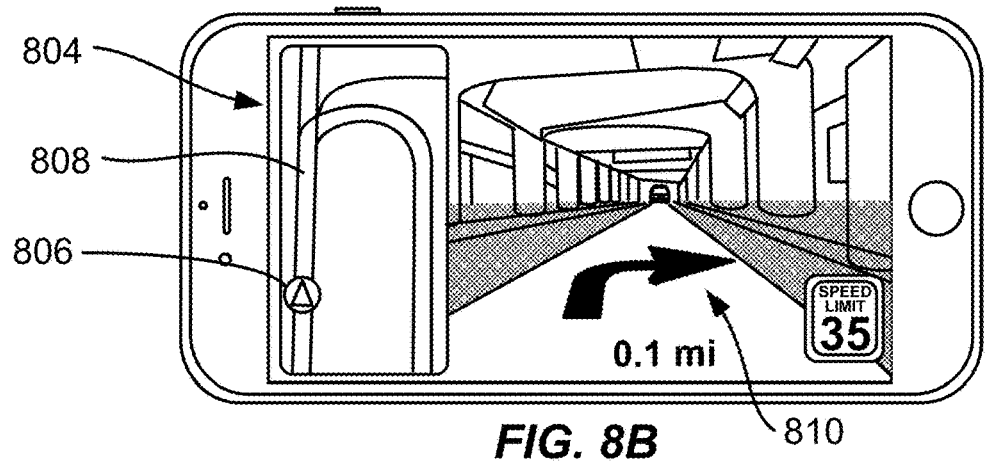
FIG. 8B is a snapshot illustrating an exemplary navigation layer including a pop-up window after a threshold distance has been crossed, according to some embodiments of the present disclosure.

FIG. 8B illustrates an exemplary navigation layer including a display area 804 for displaying additional information after a threshold distance has been crossed, e.g., when vehicle 802 is at point A, according to some embodiments of the present disclosure. Display area 804 can be a top-down view of a surrounding area that illustrates the upcoming route. In some embodiments, the upcoming route can be a highlighted route 808 and the vehicle can be represented as an arrow head 806. The information shown in display area 804 can show the user what the turn looks like, so the user can be aware that the turn is not a typical 90-degree turn despite what indicator 810 shows.

Figure 8C:
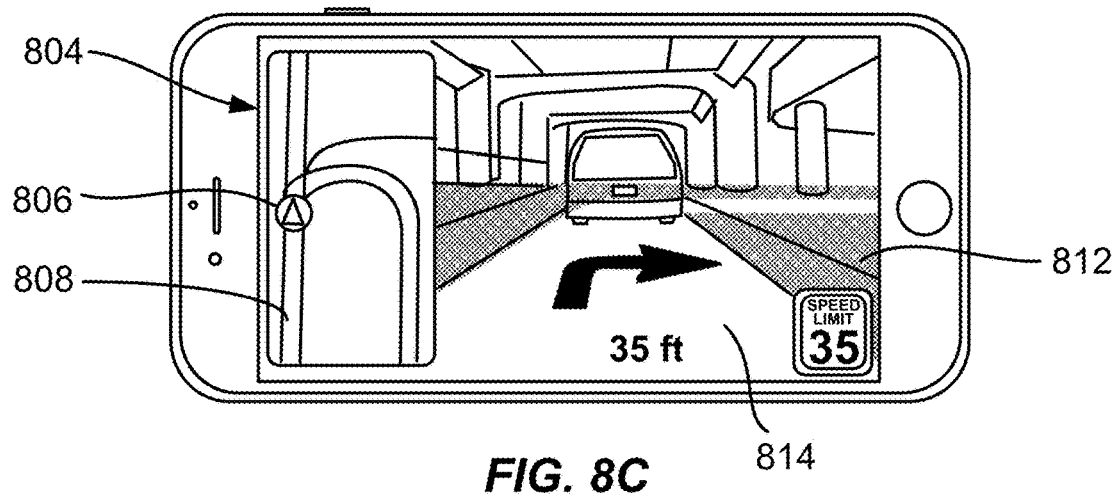
FIG. 8C is a snapshot illustrating an exemplary navigation layer including a pop-up window as the vehicle in FIG. 8B encounters the u-turn, according to some embodiments of the present disclosure.

FIG. 8C illustrates the exemplary navigation layer including display area 804 as vehicle 802 encounters the u-turn, e.g., when vehicle 802 is at point B, according to some embodiments of the present disclosure. As shown in FIG. 8C, arrow head 806 can be shown as entering the u-turn; thus, the user can be aware that he or she is about to traverse the turn. In some embodiments, the navigational layer can simultaneously provide blocked and unblocked regions over captured images representing the view perceived from the user's viewpoint. For instance, the navigational layer can include blocked region 812 and unblocked region 814. Unblocked region 814 can curve to the right along with the road, and blocked region 812 can extend across the entire display screen from the left edge to the right edge to indicate that the user should not travel forward.

Although FIGS. 8A-8B illustrate embodiments where a display area for displaying additional information is shown for traversing unusual or complex segments in a route, embodiments are not limited to such situations. In some embodiments, a display area for displaying additional information can be utilized when a vehicle is several lanes away from the designated lane. This may occur when the user has turned onto a road but needs to make another turn that can only be made from a lane on the opposite side of the road. In this case, it would be useful to convey to the user that he or she needs to make a drastic lane change to stay within the route.

By providing display area 804 in addition to blocked and unblocked regions 812 and 814, respectively, the navigational layer can clearly convey in an easily understood manner where the user should be while traveling along the route.

V. Method of Performing Lane Guidance with an Augmented Reality Device

Figure 9:
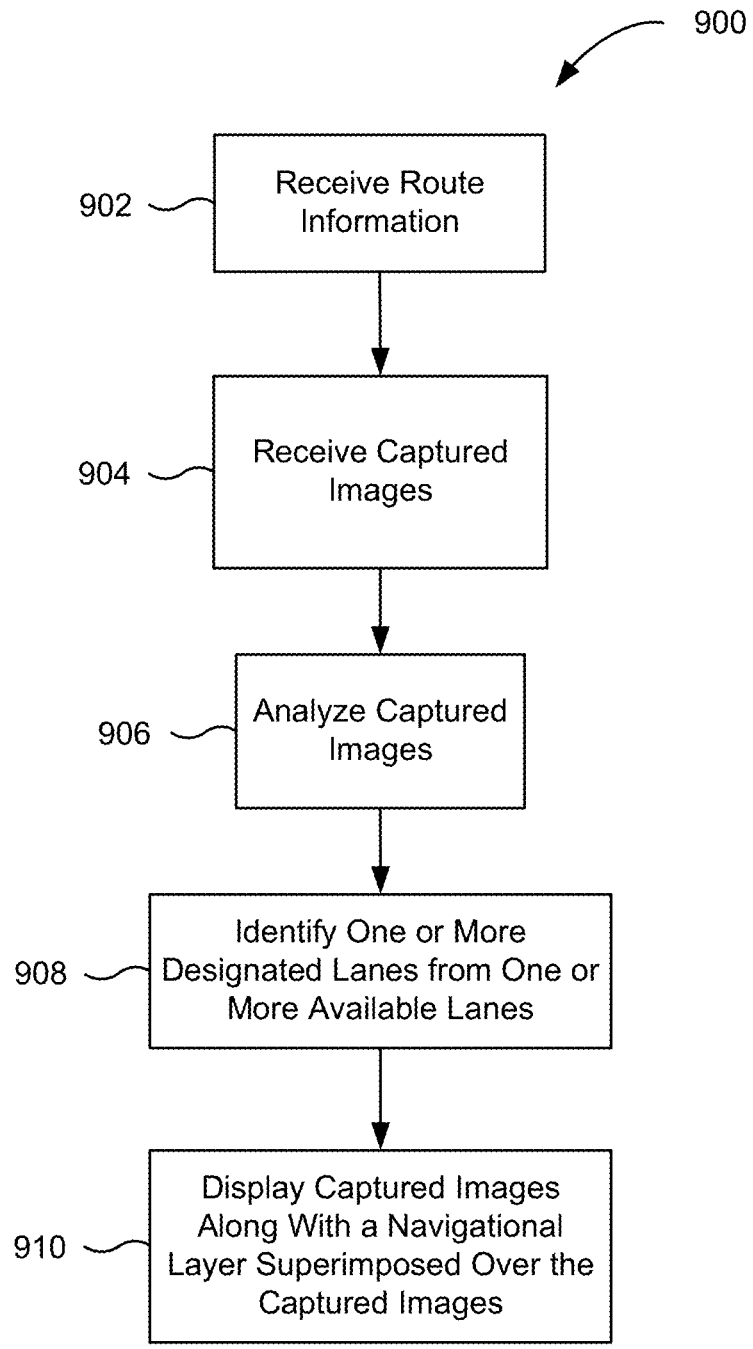
FIG. 9 is a block diagram of a method for performing navigation and lane guidance, according to some embodiments of the present disclosure.

FIG. 9 is a block diagram of a method 900 for performing navigation and lane guidance, according to some embodiments of the present disclosure. Method 900 can be performed by one or more processors that is executing code stored in memory of an augmented reality device.

At block 902, route information can be received. In some embodiments, the route information is provided through a wireless network, e.g., wireless network 312 in FIG. 3, by a route server, e.g., route server 310 in FIG. 3, that utilizes one or more databases to provide route information regarding the route of travel between an origin location to a destination location. A navigation module, such as navigation module 402 of augmented reality system 400 discussed herein with respect to FIG. 4, can receive the route information from the route server. The route information can include data such as, but is not limited to, road information (e.g., identification of roads along the route, what segments of those road will be traveled, the geographical position of those roads, the geographical position of lanes within each road, and in what order will the roads be traveled), turn information (e.g., what turns are needed along the route and in what order), lane information (e.g., number and position of lanes for each road segment), and distance information (e.g., distance to travel on each segment of road).

At block 904, one or more captured images can be received. An image analysis module, such as image analysis module 410 of augmented reality system 400 discussed herein with respect to FIG. 4, can receive the one or more captured images from an image capturing device. The one or more captured images can be a series of captured images that together form a video. The video can be real-time video footage of an area in front of a vehicle as it traverses a route, as discussed herein with respect to FIG. 3. The video can be captured by a camera that is either built in as part of the augmented reality device or separate from the augmented reality device.

At block 906, the captured images can be analyzed. In some embodiments, the image analysis module can analyze the captured images to identify one or more available lanes on the road currently traveled on by the vehicle. An available lane can be a lane in which the vehicle travel. For instance, in a four-lane highway, the available lanes can be all four lanes. Any suitable image processing method can be used to distinguish individual lanes from the captured images, e.g., the software can be trained to identify solid or dotted lines between the lanes so as to determine available lanes in the direction of travel. As an example, the software can perform image processing to identify lane markers and, over time, be trained to recognize different types of lane markers that are occasionally used on the road. In some instances, image analysis module can identify the number of available lanes as well as the position of those lanes with respect to the vehicle through the image processing. In some additional embodiments, the image analysis module can also analyze the captured images to identify a horizon. The image analysis module can identify the horizon as the border between a region of the image that has the color of the sky and a region of the image that has the color of the ground, e.g., asphalt, concrete, dirt, and the like. In other instances, the horizon can be identified as the border between an area of the image that is substantially stationary and an area of the image that is constantly changing. This is because as the vehicle is traveling, regions below the horizon are constantly moving toward the vehicle, while the sky remains relatively constant and unchanged.

At block 908, method 900 can proceed to identify one or more designated lanes from the one or more available lanes previously identified in method 900. In some embodiments, an augmented reality module, such as augmented reality module 416 of augmented reality system 400 in FIG. 4, receives the number and position of the available lane(s) with respect to the vehicle, as well as the route information. With this data, the augmented reality module can correlate the available lane information with the route information to identify one or more designated lanes from the one or more available lanes. A designated lane can be the lane in which the vehicle should travel to proceed along the route.

At block 910, the captured images can be displayed along with a navigational layer superimposed over the captured images. The navigational layer can be any of the navigational layers discussed herein with respect to FIGS. 5B, 5C, 6B, 6C, 7B, 8B, and 8C that clearly communicates to a user how the user should proceed along the route. In some embodiments, the captured images together form a real-time video of the area in front of the vehicle and the navigational layer is superimposed to correlate with the video as discussed herein with respect to the aforementioned figures. Superimposing a navigational layer over video footage of what the user can see helps clearly communicate navigational and lane guidance information to the user. Thus, the augmented reality device can provide significant improvements in navigation and lane guidance over conventional devices that merely provide symbols to guide a user along a route.

VI. Example Device

Figure 10:
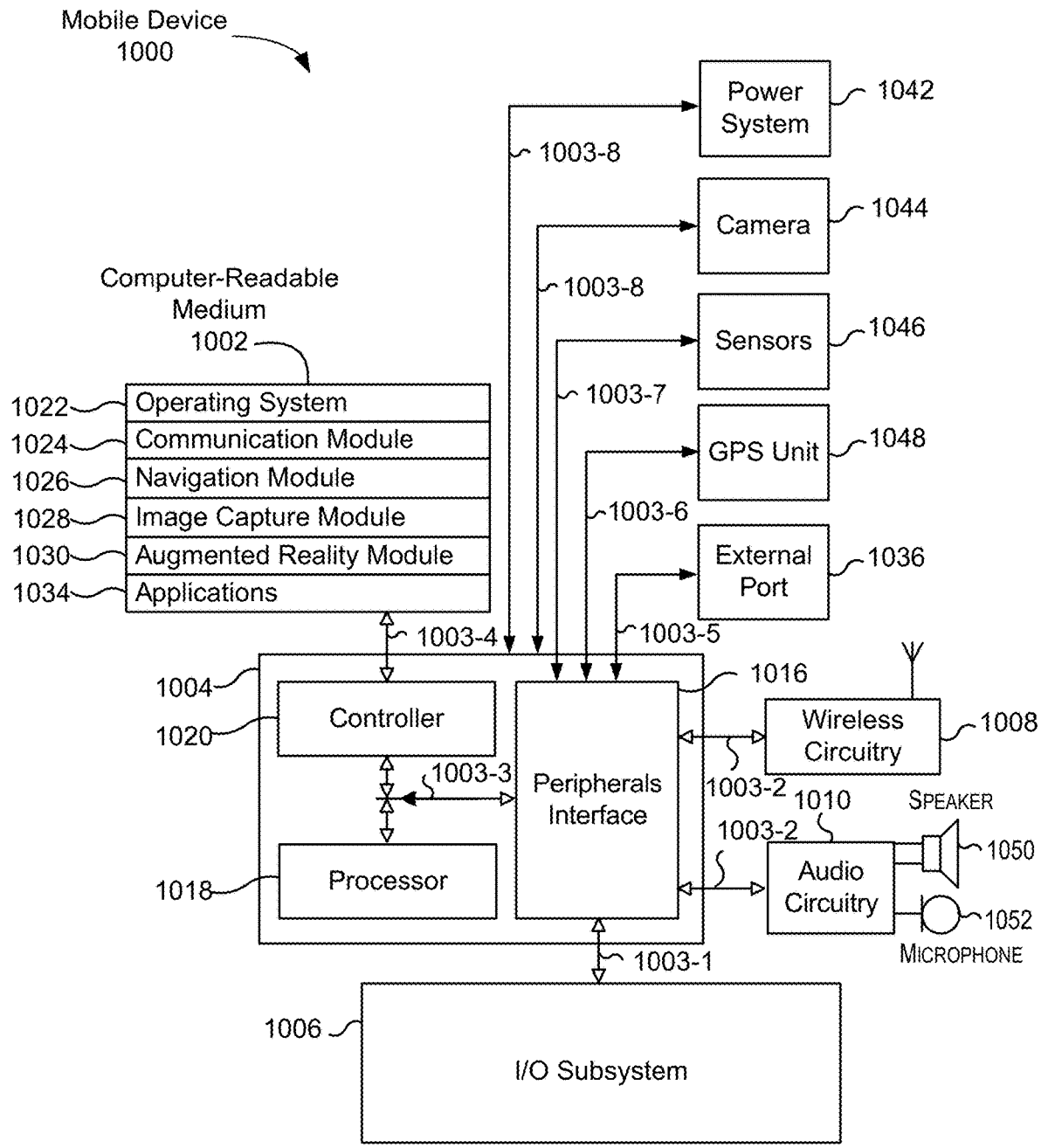
FIG. 10 is a block diagram of an example device for performing navigation and lane guidance, according to some embodiments of the present disclosure.

FIG. 10 is a block diagram of an example device 1000, which may be a mobile device. Device 1000 generally includes computer-readable medium 1002, a processing system 1004, an Input/Output (I/O) subsystem 1006, wireless circuitry 1008, and audio circuitry 1010 including speaker 1050 and microphone 1052. These components may be coupled by one or more communication buses or signal lines 1003. Device 1000 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1008 can use various protocols.

Wireless circuitry 1008 is coupled to processing system 1004 via peripherals interface 1016. Interface 1016 can include conventional components for establishing and maintaining communication between peripherals and processing system 1004. Voice and data information received by wireless circuitry 1008 (e.g., in speech recognition or voice command applications) is sent to one or more processors 1018 via peripherals interface 1016. One or more processors 1018 are configurable to process various data formats for one or more application programs 1034 stored on medium 1002.

Peripherals interface 1016 couple the input and output peripherals of the device to processor 1018 and computer-readable medium 1002. One or more processors 1018 communicate with computer-readable medium 1002 via a controller 1020. Computer-readable medium 1002 can be any device or medium that can store code and/or data for use by one or more processors 1018. Medium 1002 can include a memory hierarchy, including cache, main memory and secondary memory.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes a camera 1044. Camera 1044 can be configured to capture images of an area in front of a vehicle, as discussed herein. In some embodiments, device 1000 includes sensors 1046. Sensors can include accelerofeet, compass, gyrometer, pressure sensors, audio sensors, light sensors, barofeet, and the like. Sensors 1046 can be used to sense location aspects, such as auditory or light signatures of a location.

In some embodiments, device 1000 can include a GPS receiver, sometimes referred to as a GPS unit 1048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1018 run various software components stored in medium 1002 to perform various functions for device 1000. In some embodiments, the software components include an operating system 1022, a communication module (or set of instructions) 1024, a navigation module (or set of instructions) 1026, an image capture module (or set of instructions) 1028, an augmented reality module (or set of instructions) 1030, and other applications (or set of instructions) 1034, such as a car locator app and a navigation app.

Operating system 1022 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via wireless circuitry 1008 and includes various software components for handling data received from wireless circuitry 1008 and/or external port 1036. External port 1036 (e.g., USB, FireWire, Lightning connector, 60-pin connector, etc.) is adapted for coupling directly to other devices or indirectly over a network (e.g., the Internet, wireless LAN, etc.).

Navigation module 1026, image analysis module 1028, and augmented reality module 1030 can include various sub-modules or systems, e.g., as described herein with respect to FIG. 4.

The one or more applications 1034 on the mobile device can include any applications installed on the device 1000, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1006 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or track pad. In some embodiments, I/O subsystem 1006 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A computer-implemented method for guiding a user along a route between at least two locations, the method comprising, at a mobile device that has a display and a camera positioned to take images in front of a vehicle:
   receiving route information from a route server, the route information comprising geographical positions of roads and designated lanes of travel for each of a plurality of segments along the route;
   receiving a series of images captured by the camera along the route;
   analyzing the series of images to determine a horizon and one or more available lanes of travel along the route;
   identifying one or more of the designated lanes from the one or more available lanes based on the analyzing of the series of images and the route information; and
   displaying the series of images along with a navigational layer superimposed over the series of images to the user, the navigational layer comprising a blocked region covering areas of the series of images outside of the one or more designated lanes and below the horizon.

2. The method of claim 1, wherein the navigational layer further comprises an unblocked region revealing the one or more designated lanes below the horizon.

3. The method of claim 1, wherein the navigational layer further comprises one or more guidance arrows positioned near a center of at least one image of the series of images and below the horizon.

4. The method of claim 3, wherein the one or more guidance arrows are positioned over the blocked region and point toward the one or more designated lanes when the user is positioned outside of the one or more designated lanes along the route.

5. The method of claim 3, wherein the one or more guidance arrows are positioned over an unblocked region.

6. The method of claim 5, wherein the one or more guidance arrows indicate an upcoming turn or that the user should switch lanes.

7. The method of claim 6, wherein the one or more guidance arrows are animated such that the one or more guidance arrows blink at a frequency inversely proportional to a distance to the upcoming turn.

8. The method of claim 7, wherein the one or more guidance arrows comprise multiple arrows that blink in a sequential order.

9. The method of claim 1, wherein the blocked region covers other lanes captured in the series of images that are outside of the one or more designated lanes.

10. The method of claim 1, wherein the navigational layer further comprises a pop-up window that temporarily appears as the user approaches a turn.

11. The method of claim 10 wherein the pop-up window appears within a threshold distance to the turn and disappears after the turn has been traversed by the user.

12. The method of claim 10 wherein the pop-up window displays a top-down view of an area surrounding the user that includes a complete profile of the turn.

13. A computer product comprising a non-transitory computer readable medium storing a plurality of instructions that when executed control a mobile device including a display, a camera positioned to take images in front of a vehicle, and one or more processors for guiding a user along a route between at least two locations, the instructions comprising:
   receiving route information from a route server, the route information comprising geographical positions of roads and designated lanes of travel for each of a plurality of segments along the route;
   receiving a series of images captured by the camera along the route;
   analyzing the series of images to determine a horizon and one or more available lanes of travel along the route;
   identifying one or more of the designated lanes from the one or more available lanes based on the analyzing of the series of images and the route information; and displaying the series of images along with a navigational layer superimposed over the series of images to the user, the navigational layer comprising a blocked region covering areas of the series of images outside of the one or more designated lanes and below the horizon.

14. The computer product of claim 13, wherein the navigational layer further comprises an unblocked region revealing the one or more designated lanes below the horizon.

15. The computer product of claim 13, wherein the navigational layer further comprises one or more guidance arrows positioned near a center of at least one image of the series of images and below the horizon.

16. The computer product of claim 15, wherein the one or more guidance arrows are positioned over the blocked region and point toward the one or more designated lanes in an event the user is positioned outside of the one or more designated lanes along the route.

17. A mobile device for guiding a user along a route between at least two locations, the mobile device comprising:
a camera positioned to take images in front of a vehicle;
a display; and
one or more processors coupled to the camera and the display, the one or more processors configured to:
receive route information from a route server, the route information comprising geographical positions of roads and designated lanes of travel for each of a plurality of segments along the route;
receive a series of images captured by the camera along the route;
analyze the series of images to determine a horizon and one or more available lanes of travel along the route;
identify one or more of the designated lanes from the one or more available lanes based on the analyzing of the series of images and the route information; and
display the series of images along with a navigational layer superimposed over the series of images to the user, the navigational layer comprising a blocked region covering areas of the series of images outside of the one or more designated lanes and below the horizon.

18. The mobile device of claim 17, wherein the navigational layer further comprises an unblocked region revealing the one or more designated lanes below the horizon.

19. The mobile device of claim 17, wherein the navigational layer further comprises one or more guidance arrows positioned near a center of the display and below the horizon.

20. The mobile device of claim 19, wherein the one or more guidance arrows are positioned over the blocked region and point toward the one or more designated lanes in an event the user is positioned outside of the one or more designated lanes along the route.

* * * * *